No. 893,583. PATENTED JULY 14, 1908.
E. A. HEY & M. BRAUN.
MACHINE FOR FILLING RECEPTACLES.
APPLICATION FILED JAN. 28, 1907.

4 SHEETS—SHEET 3.

WITNESSES: INVENTORS

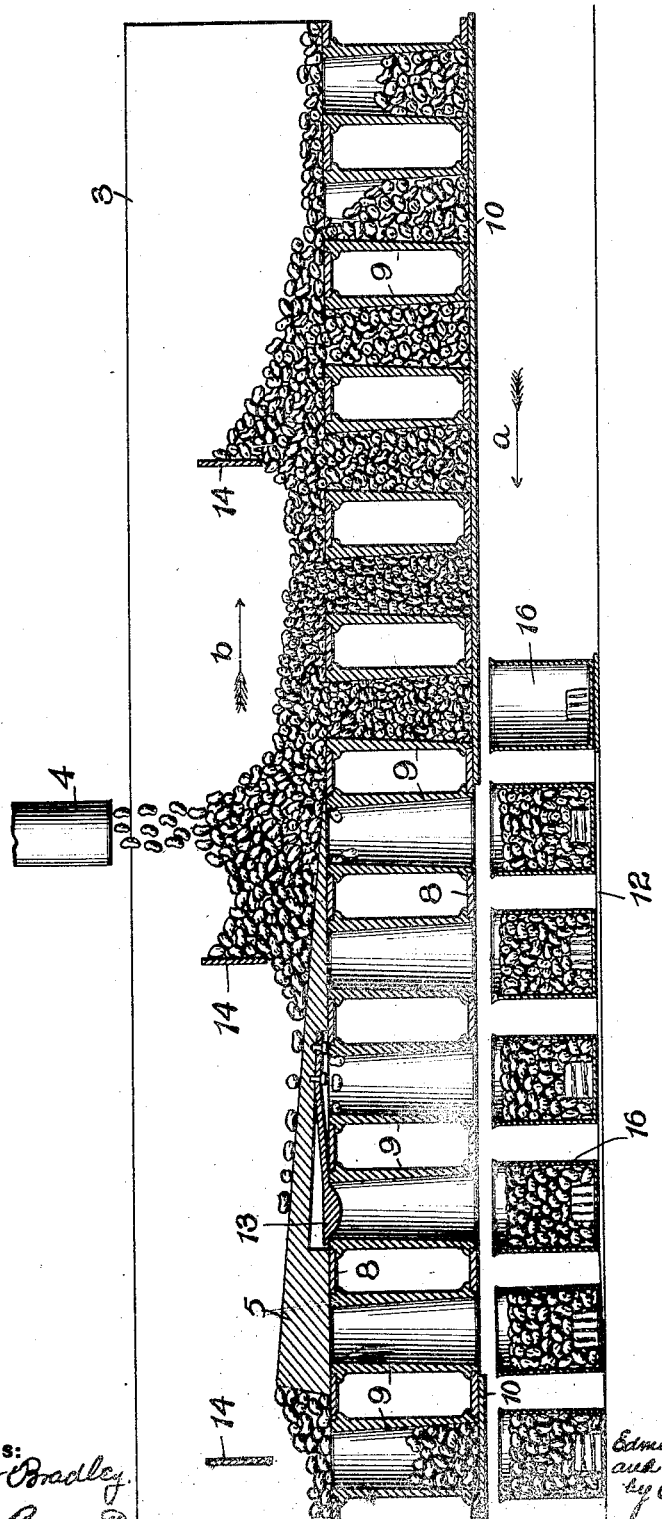

UNITED STATES PATENT OFFICE.

EDMUND A. HEY, OF WEST VIEW, AND MICHAEL BRAUN, OF ALLEGHENY, PENNSYLVANIA, ASSIGNORS TO H. J. HEINZ COMPANY, OF PITTSBURG, PENNSYLVANIA, A CORPORATION OF PENNSYLVANIA.

MACHINE FOR FILLING RECEPTACLES.

No. 893,583.  Specification of Letters Patent.  Patented July 14, 1908.

Application filed January 28, 1907. Serial No. 354,581.

*To all whom it may concern:*

Be it known that we, EDMUND A. HEY, residing at West View, Allegheny county, State of Pennsylvania, and MICHAEL BRAUN, residing at Allegheny, in the county of Allegheny and State of Pennsylvania, citizens of the United States, have invented or discovered certain new and useful Improvements in Machines for Filling Receptacles, of which improvements the following is a specification.

Our invention relates to improvements in machines for filling cans, or other receptacles, with commodities which may be handled in bulk, as for example baked beans, and other forms of food now so extensively canned for the market; and the primary object of our improvements is to provide such a machine in which fragile commodities, such as baked beans, may be handled without crushing, and in which the receptacles may be filled with greater accuracy than is ordinarily the case with such machines.

Other advantages of our improved construction will be apparent, on examination of the drawings and the specification, to one familiar with machines of this general character.

In the accompanying drawings, we have illustrated a machine for filling cans with baked beans, in which our improvements are embodied. It is obvious that the invention is not restricted to a can-filling machine as such, but is applicable to filling other receptacles and the handling of other commodities.

Figure 1:
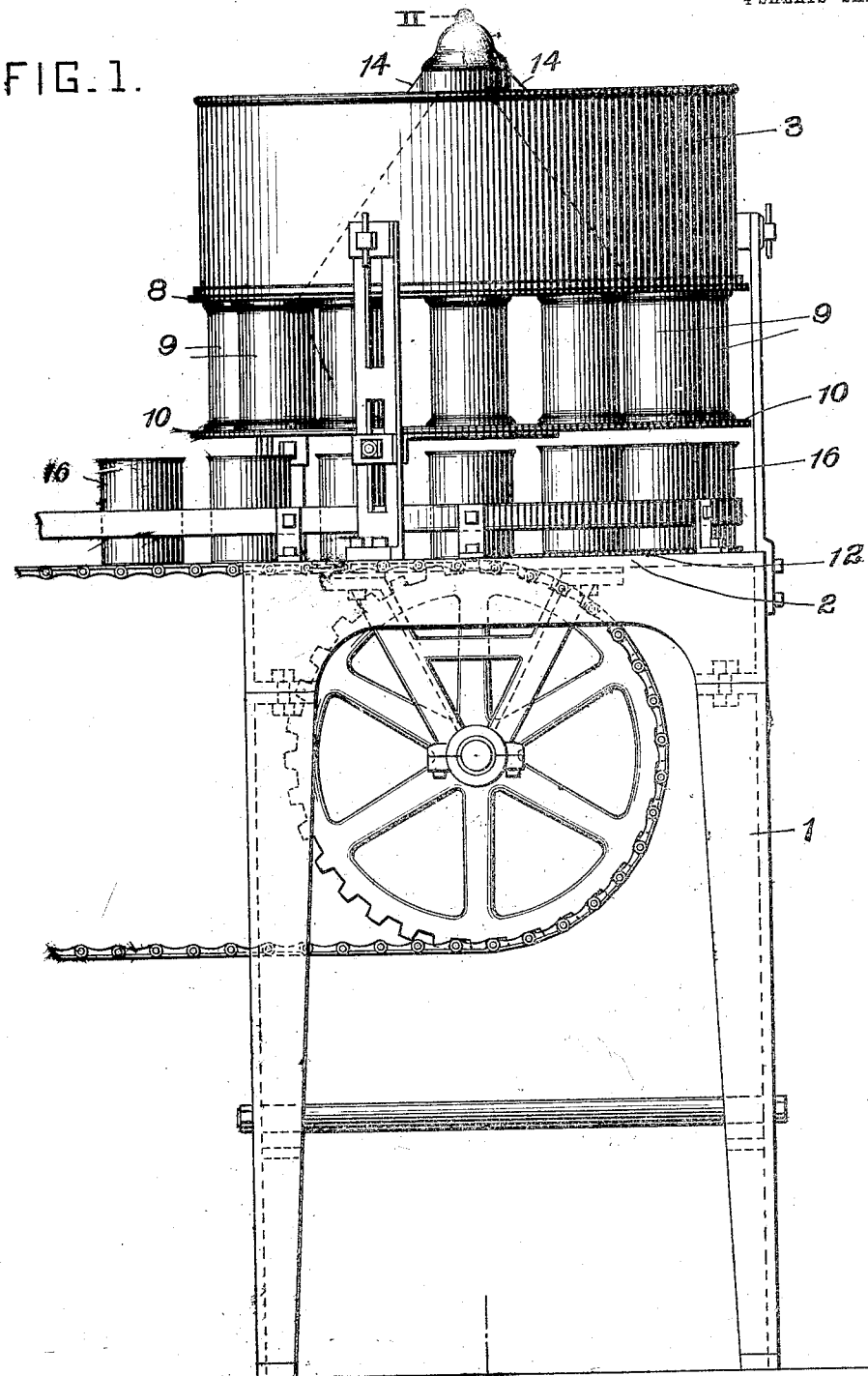
Figure 2:
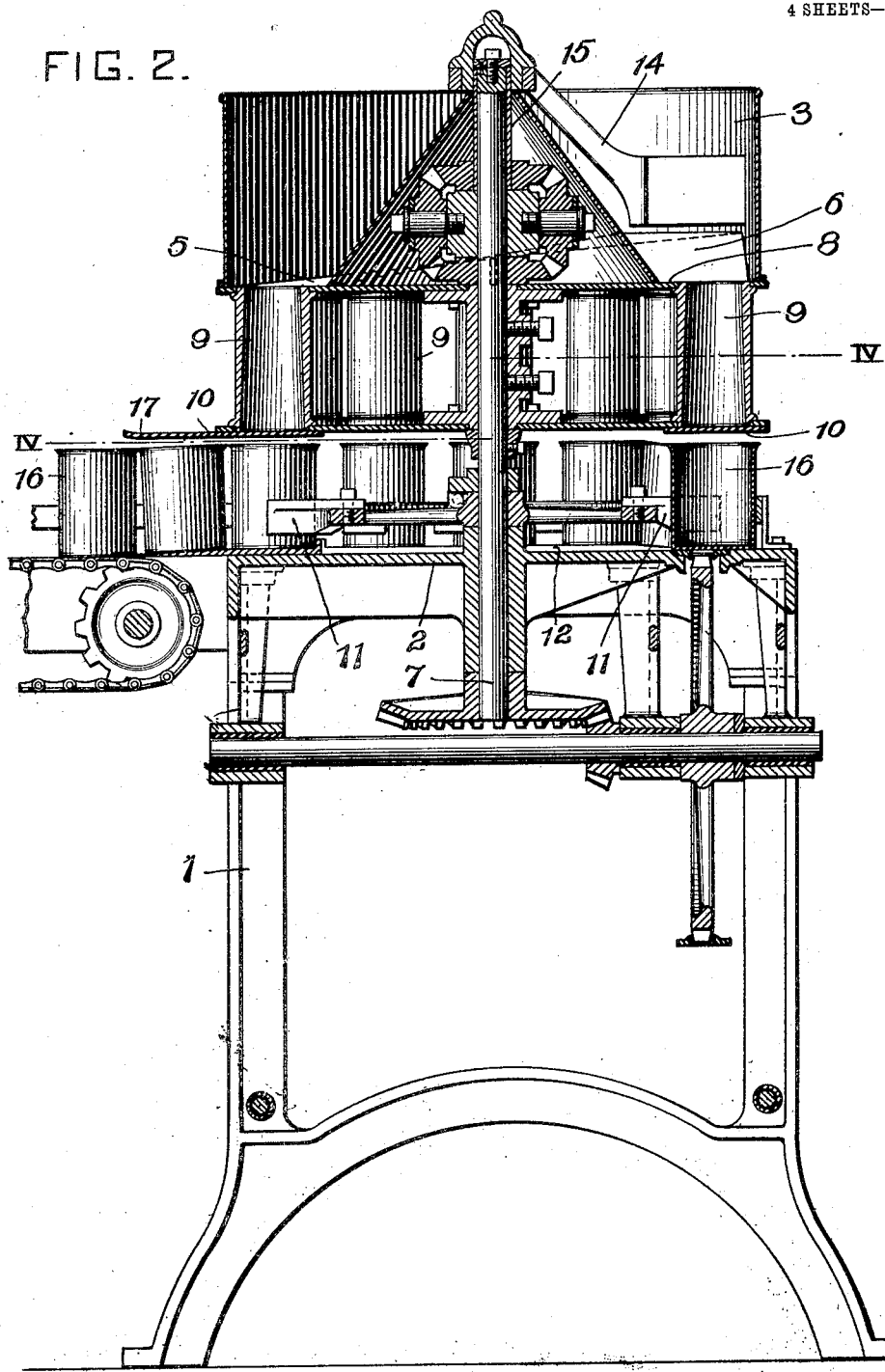
Figure 3:
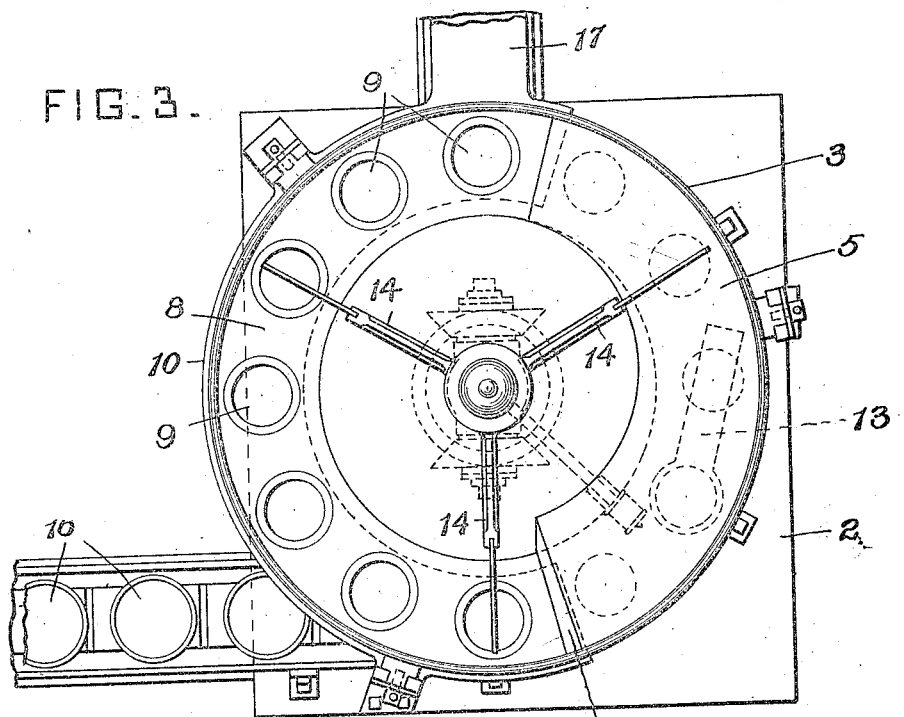
Figure 4:
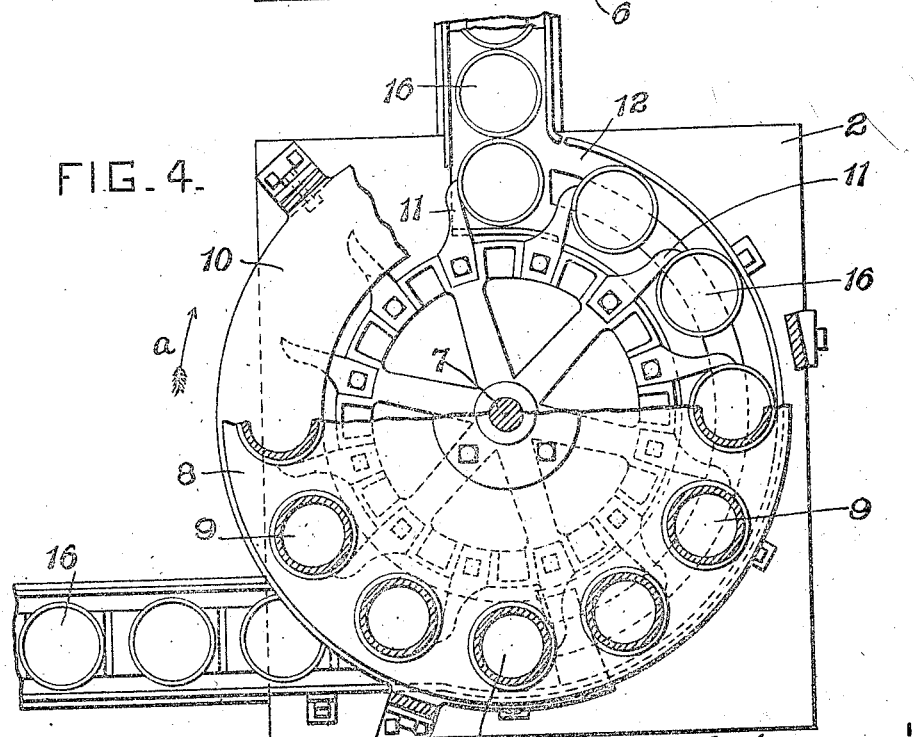

Figure 1 shows the can-filling machine in side elevation; Fig. 2 is a view in vertical section, on a plane indicated at II—II, Fig. 1; Fig. 3 is a plan view; Fig. 4 is a view in horizontal section, on the line IV—IV of Fig. 2; and Fig. 5 is a projection upon a plane of a section taken around the periphery of the machine through the hopper, the measuring chambers and underlying cans, this projection being made to show diagrammatically the cycle of operation. Parts which are repeated in the several figures bear the same reference numerals throughout.

A suitable frame, 1, with bed-plate, 2, carries a hopper, 3, in elevated position above the bed-plate. The hopper may conveniently be made removable from the frame, and adjustable in its position above the bed-plate, as is indicated in the drawings, for purposes to be hereinafter described. When the hopper is secured in position, however, it is held immovable in the frame. This hopper receives (as, for instance, through a suitably arranged chute 4—see Fig. 5) the commodity which the machine is designed to handle, and it delivers this commodity through suitably arranged measuring chambers to the cans or other receptacles which are suitably positioned on the bed-plate, 2, of the machine. To this end, the measuring chamber 9, of which many are shown in the drawings entering into the organization of the machine illustrated, is arranged beneath the hopper, so that the hopper discharges into it, and the cans or receptacles, 16, are arranged beneath the measuring chamber, in such manner that the commodity will be discharged from the measuring chamber down into the receptacles.

The feature of our invention to which we first direct attention is the shape of this measuring chamber, 9. Measuring chambers have been heretofore employed, intermediate between a hopper and receptacle, their purpose being to serve as a gage, to automatically determine the amount of the commodity which shall be discharged into each receptacle in turn, and such measuring chambers have heretofore been cylindrical chambers, opening above and below alternately, to the end in view. We direct attention to the fact that our measuring chamber, 9, though approximately cylindrical in form and thus possessing the general shape best adapted to the end in view, is, as will be seen in Fig. 2, flared slightly from top to bottom, and this flared construction permits a freer discharge of the commodity when the chamber is open below, and is a provision against sticking or choking of the commodity in the chamber.

The measuring chamber or chambers, arranged beneath the hopper, close the mouth of the hopper so that the only escape from the hopper is through such measuring chamber or chambers. This chamber or these chambers are, in the operation of the machine, movable relative to the hopper itself. In such relative movement, the measuring chamber or chambers advance to and from communication with the orifice. When communicating with the hopper-orifice, they receive the commodity; but when they advance and communication with the hopper is cut off, they discharge their contents to the receptacles which are brought to suitable position beneath them.

In addition to the flared form of the measuring chamber which, as above stated, assists the free discharge of the commodity, further means are provided for removing from the interior of the measuring chamber any small portions of the commodity which may adhere to the inner walls thereof after the discharge of the bulk of the contents of the chamber. Our preferred means to that end are best shown in the diagrammatic Fig. 5. A disk, 13, with downwardly convex surface and corresponding in shape and size to the circular upper end of the measuring chamber, is mounted to fall upon or "clap" upon the upper end of the measuring chamber when the lower end thereof is open and the commodity substantially discharged; and, in so clapping upon the upper end of the chamber, such small quantities of commodity as may remain adhering to the chamber walls are removed, and fall to the underlying receptacle. This disk 13 may conveniently be arranged beneath the hopper; and, as shown, may conveniently be carried at the end of a flexible arm, in such manner as to depend into the path of movement of the measuring chamber. The advancing measuring chamber then bearing upon its convex face causes the disk first to rise and then leaves it free to descend and, as the machine travels at appreciable speed, to clap upon the upper end of the measuring chamber to perform the described function.

A plate, 10, forms a closure for the lower end of the measuring chamber or chambers, when the latter are in communication with the hopper orifice, but leaves such chamber or chambers open below when their communication with the hopper is cut off; to the end that the advancing measuring chamber, being first closed below and open above and then closed above and open below, will alternately receive from the hopper and discharge to an underlying receptacle its full measure of the commodity. This plate, 10, is in fixed position relative to hopper 3, and accordingly it may conveniently be mounted in the frame, 1, of the machine. As shown in the drawings, plate 10 like hopper 3 is adjustable in its mounting in frame 1, and for the same end, as will presently be described.

It has been found desirable, in building machines of this general character, to so arrange the measuring chamber or chambers that they shall travel in a circular path beneath the hopper, and to so form the hopper-orifice that the commodity shall be fed through it into the measuring chamber or chambers as they advance in such circular path. To this end, hopper 3 of our improved machine is conveniently formed by and between an outer cylindrical wall and an inner, concentrically arranged, conical wall with a ring-shaped orifice below. This ring-like orifice is closed throughout a portion of its extent by a plate 5, and the measuring chambers advancing beneath are alternately open to receive the commodity which the hopper contains and closed by plate 5 from communication with the hopper.

Plate 10, described above in general terms, is, it will be noted, shaped to correspond with this circular arrangement of the measuring chambers, and is so placed as to close the measuring chambers below while they are open above, and to leave them open below when cut off from communication with the hopper above and thus permit discharge to receptacles advancing beneath in a corresponding path. Viewed from above, the plates 5 and 10 together form a complete ring, their ends overlapping somewhat, as is indicated in Fig. 3. Upon the bed-plate, 2, of the machine, a track, 12, is arranged; and upon it a series of cans or other receptacles are propelled. This track extends in curved form beneath the path of movement of the measuring chambers, and throughout so much of that path as is not closed by plate 10.

A difficulty has heretofore existed in the operation of machines of this general character, when the commodity which is being handled is of a fragile nature, because the commodity is liable to be crushed in the action of the machine. To avoid this difficulty, we provide what we here term a spreader. This is preferably an instrument in the form of a series of paddles, which progress through the hopper, above the orifice thereof, and in direction opposite to that of the measuring chambers already described. Plate 5 is shaped to coöperate with this spreader in carrying the fragile commodity to the measuring chamber. Plate 5, as has been said, extends over a portion of the annular hopper-orifice. The hopper itself and its orifice are arranged in substantially horizontal plane, and this plate 5 extends on an incline, one edge being substantially flush with the hopper orifice, and from that point it slopes upward in the hopper throughout substantially its entire extent, and it terminates abruptly in a steep pitch down again to the hopper-orifice. The long slope of this inclined plate 5 descends from its highest to its lowest point in the direction in which the spreader travels. The practical effect of this arrangement is brought out in Fig. 5; and a further feature there appears, and that is that chute 4 preferably discharges its supply of commodity at or near the lower edge of the long incline of plate 5. The spreader passing the direction indicated by the arrow $b$, sweeps the commodity thus supplied beyond the edge of plate 5, where it falls freely into and fills the measuring chamber or chambers which are there open to receive it. The supply may properly be so controlled that substantially all of the commodity is thus swept into the measuring chambers, any surplus being deposited in the pocket or angle formed between the rim of the measuring chamber or chambers and the steep face 6 of plate 5, whence it freely descends into the advancing open mouth of the measuring chamber, as the latter passes from beneath the plate 5, moving in the direction indicated by the arrow a. Furthermore, as the drawings show, this inclined plate 5 makes provision for a space between the hopper and the measuring chamber when in discharge position, wherein the means described above for clapping out any commodity adhering to the side walls of the chamber may conveniently be located.

A shaft, 7, extends vertically through the bed-plate of the machine, concentrically with the circular hopper above; and suitable means are provided for causing this shaft to rotate. Rigidly secured to shaft 7 and rotating therewith is a drum, 8, which extends beneath the annular hopper-orifice and which carries a series of measuring chambers, 9, arranged in a ring about its periphery and beneath said hopper-orifice.

A series of radial arms, 11, mounted upon shaft 7 and advancing as the shaft rotates, are so placed and arranged that they propel a series of cans along the track, 12; and throughout the extent of track 12 a can advances in vertical alinement with each one of the measuring chambers disposed above. Automatic means may be provided for feeding the unfilled cans to the machine and carrying the filled cans from the machine. These features are well known in the art. It may however be observed in passing that, ordinarily, in such machines the means for automatically supplying the cans and for carrying them away again are endless belts. The successive cans advance to position upon the bed of the machine and into the range of arms 11 by being pushed forward by the cans advancing behind on the endless belt. To retain the cans in line and prevent them from getting displaced and insure their regular advance into the range of movement of radial arms 11, an extension, 17, of plate 10 covers the approach of the empty cans to the machine. This is clearly shown in Fig. 2. It will be understood that the track, 12, extends in ring-like form to overlap the ends of the incomplete ring-plate 10. This feature is indicated in Figs. 2, 3, and 4.

The spreader within the hopper, which has been described in general terms above, in this instance consists of a three-armed paddle mounted upon a shaft, 15, which rises concentrically through the conical inner wall of the hopper. By interposed beveled gearing, rotation is imparted to this spreader from shaft 7 in the direction opposite to the rotation of shaft 7, and the parts mounted upon it.

Note has been made above of the removability and adjustability of hopper 3 and of plate 10 upon the frame of the machine. This is not only a matter of structural convenience; it also permits the removal of the measuring chambers and substitution of others of different size, thus varying the size of charge delivered to the successive receptacles. Ordinarily, plate 10 of the machine will be secured at such distance above the bed-plate as to permit the free travel of receptacles of desired size beneath it on track 12; drum 8, with its measuring chambers of desired capacity, will then be secured upon shaft 7; and hopper 3 will finally be brought to position and secured to the frame of the machine at such a height as to permit drum 8 to revolve beneath it, fitting snugly between the hopper-orifice above and plate 10 below, for the purposes already indicated.

The operation of the parts will readily be understood from the foregoing description. The beans or other commodity from any suitable source may be introduced into the hopper in any desired manner, and, as the spreader 14 travels, they are distributed therein. Passing into the measuring chambers, which advance progressively from beneath plate 5, they fill these measuring chambers—for when the measuring chambers are open above, they are closed below by plate 10. The rotation of the machine carries the filled chambers beneath plate 5, thus cutting off communication with the hopper above, and beyond the edge of plate 10, thus leaving them open below. When thus open below, and receptacles previously brought into vertical alinement stand directly beneath them, the contents of the measuring chambers descend freely into the receptacles, the flaring shape of these chambers assisting in that discharge. Furthermore, as the open measuring chambers and the substantially filled receptacles advance in unison, the clapper, 13, clapping upon the top of the succeeding measuring chambers, effects the dislodgment of any of the commodity which may still adhere to the walls thereof. The receptacles advance in unison with the measuring chambers, one receptacle arranged directly beneath each chamber. The measuring chambers thus completely emptied advance again upon plate 10, and from beneath plate 5, to be refilled, while the successive receptacles, as they are thus charged, are carried away from the machine, to be ultimately closed and sealed and prepared for the market.

We claim as our invention:

1. In a machine for filling receptacles, the combination of a hopper having a discharge orifice, a measuring chamber arranged to receive the discharge from the hopper, means for opening and closing communication from said hopper to said measuring chamber, means operating in alternation with said first-named means for opening and closing the bottom of said measuring chamber, and means operating when said measuring chamber is cut off from communication with said hopper and is open below for dislodging from the walls of said measuring chamber commodity adhering thereto, substantially as described.

2. In a machine for filling receptacles, the combination of a hopper having a discharge orifice, a measuring chamber open above and below which in the operation of the machine advances relatively to said hopper and to and from communication with said discharge orifice, means for closing said measuring chamber below when in free communication above with the discharge orifice of the hopper, and means for dislodging from the walls of the measuring chamber commodity adhering thereto after the contents of the said chamber have been substantially discharged, substantially as described.

3. In a machine for filling receptacles, the combination of a hopper having a ring-shaped discharge orifice extending in a substantially horizontal plane, a plate lying within said hopper, closing a portion of said orifice and inclined therein, its lower edge substantially flush with the hopper orifice and its upper edge elevated above said hopper orifice, a measuring chamber arranged beneath said hopper and advancing as the machine operates throughout the extent of the hopper orifice, a clapper arranged beneath said inclined plate and as the machine operates clapping upon the upper end of said measuring chamber and thereby loosening commodity adhering to the walls thereof, substantially as described.

4. In a machine for filling receptacles the combination of a hopper having a ring-shaped discharge orifice, closed throughout a portion of its extent, a series of measuring chambers arranged to advance beneath said orifice of the hopper, and a spreader arranged within the hopper advancing as the machine operates above said discharge orifice and in direction opposite that in which the underlying receiving chambers advance, substantially as described.

5. In a machine for filling receptacles the combination of a hopper having an extended discharge orifice lying in a substantially horizontal plane, a plate lying within said hopper, closing a portion of said discharge orifice and inclined therein, its lower edge substantially flush with said orifice and its upper edge elevated above said orifice, a spreader for the commodity advancing as the machine operates above and throughout the extent of said orifice and in a direction from the elevated edge of said plate down the incline thereof, and a measuring chamber advancing as the machine operates beneath and throughout the extent of said hopper orifice and in direction opposite to that of said spreader, substantially as described.

6. In a machine for filling receptacles, the combination of a hopper having a ring-shaped discharge orifice, a plate within said hopper covering a portion of said discharge orifice and inclined from end to end in the direction of the curved line of the discharge orifice, a spreader arranged within said hopper and advancing as the machine operates above said ring-shaped discharge orifice and in a direction down the incline of said plate, and a measuring chamber arranged beneath the hopper orifice and advancing as the machine operates in direction opposite to the advance of said spreader, and a chute through which commodity is supplied to said hopper at a point adjacent to the lower edge of said inclined plate, substantially as described.

7. In a machine for filling receptacles the combination of a horizontally disposed bed-plate, a hopper secured in elevated position above said bed-plate, and provided with a ring-shaped discharge orifice, a plate lying within said hopper and extending therein to close a portion of the orifice thereof, a second plate arranged at an interval beneath said hopper orifice and extending throughout so much of said orifice as is left uncovered by said first named plate, a spreader advancing in said hopper above said ring-shaped orifice, a series of measuring chambers arranged in ring like formation beneath the hopper orifice and above said second-named plate and advancing in direction opposite to the advance of said spreader, and a series of receptacles advancing upon said bed plate beneath and in unison with said measuring chambers throughout so much of their annular path of travel as is not covered by the second of the two plates named above, substantially as described.

In testimony whereof, we have hereunto set our hands.

EDMUND A. HEY.
MICHAEL BRAUN.

Witnesses:
CHARLES BARNETT,
J. HERBERT BRADLEY.